No. 798,958. PATENTED SEPT. 5, 1905.
G. W. & C. E. GOSS.
CORN HUSKING IMPLEMENT.
APPLICATION FILED SEPT. 27, 1904.

George W. Goss
Charles E. Goss
Inventors

Witnesses by
Attorneys

UNITED STATES PATENT OFFICE.

GEORGE W. GOSS AND CHARLES E. GOSS, OF BALTIMORE, OHIO.

CORN-HUSKING IMPLEMENT.

No. 798,958. Specification of Letters Patent. Patented Sept. 5, 1905.

Application filed September 27, 1904. Serial No. 226,215.

*To all whom it may concern:*

Be it known that we, GEORGE W. GOSS and CHARLES E. GOSS, citizens of the United States, residing at Baltimore, in the county of Fairfield and State of Ohio, have invented a new and useful Corn-Husking Implement, of which the following is a specification.

This invention relates to corn-husking implements; and it consists in the production of a simply-constructed implement of this character whereby the husks may be stripped from the ears and means provided for severing the binding-twine or other medium with which the bundles are bound at the time of harvesting.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportion, and general assemblage of the parts may be resorted to without departing from the principle of the invention or sacrificing any of its advantages.

Figure 1:
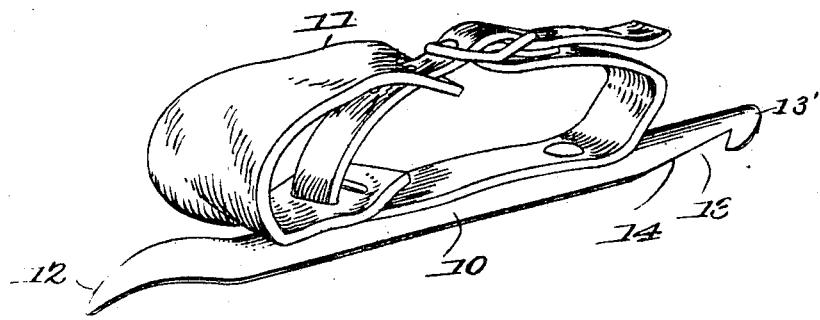
Figure 2:
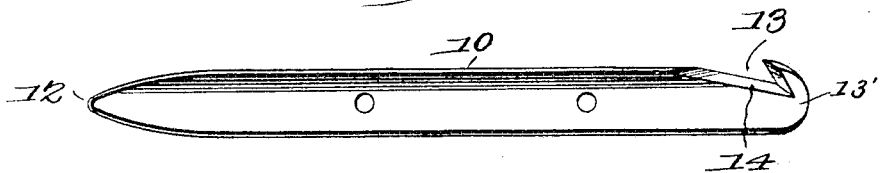
Figure 3:
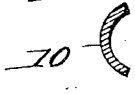

In the drawings thus employed, Figure 1 is a perspective view of the improved implement. Fig. 2 is a view from the interior of the combined stripping and band severing bar. Fig. 3 is a transverse section of the bar.

The improved implement comprises a bar 10, preferably semitubular in transverse section, as shown in Fig. 3, and provided with the usual means, as by straps 11, for connection to the fingers of the operator.

The bar 10 is extended at one end into a stripping-point 12 and is provided at its opposite end with a lateral recess 13, formed in side of the bar and defining a terminal hook 13', the walls of said recess being undercut or beveled, as indicated at 14, to thereby produce a knife or cutting edge, as shown. By this means a very efficient and easily-operated cutting member is provided, by means of which the binding-twine employed to hold the bundles of corn can be quickly severed by a forward movement of the same hand of the operator to which the implement is attached and without the loss of a moment of time, as the severing can be instantly accomplished without delaying the stripping movements.

The undercut form of the outer terminal of the recess and the inclined form of the remainder of the same insure the certain and accurate guidance of the binding-twine into the recess and the severing of the same by merely drawing the bar over the same from the stripping end toward the cutting end, as will be obvious.

The implement can be inexpensively manufactured and will be very useful and convenient for the purpose described.

Having thus described the invention, what is claimed is—

A corn-husking implement comprising a bar having one end thereof extended longitudinally to form a stripping-point and its opposite end provided with a lateral V-shaped recess defining a terminal hook, the walls of said recess being sharpened to form cutting edges one of which is of greater length than the other and extends along the longitudinal edge of the bar a short distance beyond the bill of said hook, and means carried by the bar for attachment to the hand.

In testimony that we claim the foregoing as our own we have hereto affixed our signatures in the presence of two witnesses.

GEORGE W. GOSS.
CHARLES E. GOSS.

Witnesses:
S. E. BROYLES,
SAML. FENSTERMACKER.